United States Patent [19]

Stimac

[11] Patent Number: 4,748,766
[45] Date of Patent: Jun. 7, 1988

[54] ANIMAL TRAP

[76] Inventor: Frank R. Stimac, 1945 Light, Beaumont, Tex. 77703

[21] Appl. No.: 829,015

[22] Filed: Feb. 13, 1986

[51] Int. Cl.⁴ .................................... A01M 23/04
[52] U.S. Cl. .................................................. 43/69
[58] Field of Search ..................... 43/69, 61, 64, 66, 70

[56] References Cited

U.S. PATENT DOCUMENTS

| | | | |
|---|---|---|---|
| 986,612 | 3/1911 | Warner | 43/70 |
| 1,173,669 | 2/1916 | Longenbaugh | 43/69 |
| 1,335,882 | 4/1920 | Drag | 43/69 |
| 1,597,551 | 8/1926 | Stewart | 43/69 |
| 1,750,075 | 3/1930 | Waterman | 43/69 |
| 2,835,070 | 5/1958 | Gomez | 43/69 |
| 3,423,870 | 1/1969 | Kost | 43/69 |

FOREIGN PATENT DOCUMENTS

| | | | |
|---|---|---|---|
| 49964 | 12/1917 | Sweden | 43/105 |
| 11556 | 6/1892 | United Kingdom | 43/69 |

Primary Examiner—Gene P. Crosby
Attorney, Agent, or Firm—D. Arlon Groves

[57] ABSTRACT

A self-resetting animal trap utilizing a closed-door approach wherein the trap is set or ready when its trap door is closed. The self-resetting animal trap has an enclosure with a top opening and a pivotally mounted trap door for the top opening. A metal plate is attached to the trap door frame beneath the trap door such that the trap door has an upwardly and downwardly pivoting portion. A magnet is slideably mounted to the underside of the upwardly pivoting portion such that the magnet is in contact with the metal plate when the trap door is closed. The magnet and the metal plate form the trigger mechanism for the trap. The weight of the magnet also urges the trap door toward a set-closed position from a tripped-open position, thereby resetting the trap. A bait container is positioned near the end of the downwardly pivoting portion. A chute is also provided allowing approach to the bait container only via the trap door.

6 Claims, 3 Drawing Sheets

ANIMAL TRAP

BACKGROUND OF THE INVENTION

This invention relates to animal traps and, more particularly, to a so-called "live" animal trap of the type wherein an animal is trapped unharmed within an enclosure.

Many techniques and apparatus exist which effect the general function of trapping or holding animals of various sizes. If the animal is sufficiently small, such as a squirrel, rabbit or the like, the apparatus is oftentimes portable. Typical of such traps are those utilizing spring-jaw arrangements which, when triggered, serve to snap shut upon an extremity such as a leg of the animal, usually severely injuring the animal in the process. Another variety of traps is the so-called live animal trap which, by and large, comprises an enclosure such as a cage which serves to trap any animal that wanders thereinto in a fashion whereby the animal is totally unharmed. Due to their inherent humane characteristics, these so-called live animal traps have enjoyed increasingly wide spread use.

Such live animal traps of the prior art generally comprise a box-like cage having at least one side opening or passage therein, the opening being selectively sealed or closed by a door through operation of a triggering device placed within the cage. Accordingly, an animal is lured through this side opening into the cage by bait such as food placed on the triggering device. The animal will subsequently trigger the triggering device by placing its weight on the same as it approaches the bait or by tugging at the bait itself. The trigger device thereafter closes the door and serves to seal off the opening behind the animal. Thus, the animal is trapped within the cage and unharmed. Exemplary of such state of the art devices are those depicted and described in the following U.S. patents, namely: U.S. Pat. Nos. 3,394,487 Wood et al.; Hanlan—3,483,652; Gilbraugh—3,624,951; Sonza et al.—3,834,063 and 3,913,258; and Wyant—4,162,588.

However, having elected a trap design wherein the cage utilizes an "open-door" approach, the prior art therefore had to address and formulate solutions to associated problems related to triggering devices and providing a less threatening environment to the animal sought to be trapped. For example, it is obvious that the cage door must be quickly operative with a snap-action closing upon actuation of the triggering device so as not to allow the animal time to escape. Mechanisms utilized by the prior art to achieve this necessary function have usually been extremely complex and prone to failure, primarily due to the number of moving parts involved. Additionally, the triggering device or mechanism utilized must be fail-safe in operation and must be sensitive to movement by the animal. On the other hand, the triggering operation cannot be overly sensitive for fear that simple jarring of the trap could accidentally effect closing of the door, thus rendering the interior of the trap inaccessible to animals and the trap inoperative. Prior art traps of this general type normally do not satisfactorily provide a trigger mechanism which operates in accordance with these requisite expectations. Additionally, when a so-called live animal trap of the type having a plurality of openings and doors is utilized, the trigger mechanisms of prior art cage constructions have been unable to reliably and simultaneously control the release of the plurality of doors. Furthermore, due to the typical trigger construction of the prior art, it is difficult to set the trigger of such multi-door traps in a facile manner.

In providing a less threatening environment, the prior art has either hidden the door from sight or altered the appearance or shape of the cage. For example, Gilbraugh and Souza et al. utilize a folded door design to hide the door when the trap is in a set configuration. The door is only collapsible inwardly towards the interior of the cage about a horizontal fold axis. Once the trap is tripped or sprung, the door is urged into an unfolded configuration by a biasing means such as a spring or gravity, whereby the door snaps shut so as to trap the animal unharmed in the cage. On the other hand, in U.S. Pat. No. 4,232,472, Muelling utilizes an enclosure having the shape of a hollow prismoid which provides an illusion of greater depth, thereby thought to offer a less threatening environment to the animal entering the trap.

However, with the open-door approach, the fact remains that the animal must enter the enclosure prior to tripping or springing the trap. This poses the greatest disadvantage of the open-door approach in that the animal's hunger and/or curiosity must be great enough to overcome its apprehension or fear about entering the cage in the first place.

From the above, it is apparent that there exists a need for a live animal trap which provides a less threatening environment to the animal sought to be trapped and at the same time avoids complex triggering devices. The present invention solves this need in a novel and unique manner which completely avoids the above-mentioned "open-door" considerations, problems and associated solutions by utilizing a "closed-door" approach.

SUMMARY OF THE INVENTION

The present invention is directed to a self-resetting animal trap which utilizes a "closed-door" approach. Unlike the open-door approach of the prior art, the closed-door approach is one in which the animal trap is in a set or ready condition when the trap door is closed. Thus, the fear of an overly sensitive triggering mechanism is eliminated, particularly with respect to accidental closure of the trap door. The interior of the trap remains accessible to animals and the trap remains operative with the trap door shut by design. Furthermore, such an approach to trap making provides a less threatening environment for the animal sought to be trapped in that the animal does not have to enter into the interior of the trap prior to triggering the trap. Additionally, this approach also lends itself to the provision of a self-resetting animal trap which permits the capture of a plurality of animals by a single trap. Thus, the need for multi-door traps and associated triggering mechanisms is virtually dispensed with.

Briefly, the invention in its broadest aspect comprises an enclosure having a top opening and a pivotally mounted trap door for the top opening. The trap door has a set-closed position and a tripped-open position. Preferably, the trap door has means for urging the trap door toward the set-closed position from the tripped-open position. In a preferred embodiment, the trap door has a downwardly and an upwardly pivoting portion. In such a configuration, the above-mentioned urging means may, for example, comprises a weight attached to the upwardly pivoting portion of the trap door. Thus, gravity provides the force urging the trap door to the closed position.

The trap preferably further comprises a trigger means for maintaining the trap door in the set-closed position until it is actuated by an animal positioned on the trap door. Once the trigger means is actuated, the trigger means releases the trap door which is thereafter urged to the tripped-open position by the weight of the animal itself. The animal is then deposited within the enclosure disorienting same. The disorientation allows sufficient time for the trap door to be urged to the set-closed position, thereby resetting the trap. In addition, the trigger means preferably further comprises means for selectively calibrating the sensitivity of the trigger means to different animal weight minimums.

Though not a pre-requisite of the "closed-door" approach, the trap door preferably has both an upwardly and a downwardly pivoting portion. Once the animal is lured onto the trap door by first walking on the upwardly pivoting portion and then on the downwardly pivoting portion, the trigger means actuates and allows the trap door to pivot. The upwardly pivoting portion forms a barrier which effectively blocks the animal's retreat from whence it came. However, in such a configuration, means for limiting the pivoting movement of the trap door is preferred. This ensures the return of the trap door to the set-closed position after the trigger means has been actuated rather than pivoting more than 90 degrees whereby the trap door will continue to pivot approximately 180 degrees and render the trap inoperative. In addition, means for restricting access to the upwardly pivoting portion of the trap door from within the trap by a captured animal is preferably incorporated to prevent the escape of same.

The trigger means is preferably a magnetic trigger means. The magnetic trigger means maintains the trap door in the set-closed position until it is actuated by an animal positioned on the trap door opposite the magnetic trigger means relative to the pivot point of the trap door, i.e., on the downwardly pivoting portion of the trap door. The magnetic trigger means preferably comprises a magnet mounted to the underside of the upwardly pivoting portion of the trap door and a metal plate attached to the interior facing surface of the trap door frame beneath the upwardly pivoting portion of the trap door. In such a configuration, the magnet serves the dual purpose of being an integral part of the trigger means and of providing the means for urging the trap door toward the set-closed position from the tripped-open position by virtue of its weight and magnetic attractive force. In addition, the above-mentioned magnet is preferably slidably mounted on the upwardly pivoting portion of the trap door in a perpendicular relation to the pivot point of the trap door. Thus, the trigger means may be selectively calibrated for different animal weight minimums by adjusting the length of the lever upon which the magnetic attractive force is acting.

The metal plate also serves multiple purposes. First, the metal plate forms an integral part of the trigger means. Second, the metal plate is mounted so as to restrict access to the upwardly pivoting portion of the trap door by a captured animal. Finally, the metal plate is of sufficient length and mounted so as to limit the pivoting movement of the trap door, thereby ensuring the return of the trap door to the set-closed position.

The preferred embodiment further comprises a bait container mounted to the outward surface of the trap door frame adjacent to the end of the downwardly pivoting portion of the trap door so as to lure the animal onto same. In addition, means for restricting approach to the bait container may be preferably added such that the bait therein is only approachable by way of the trap door; for example, a chute. The chute is preferably U-shaped and preferably comprises a pair of parallel sidewalls mounted to the trap door frame on either side of the trap door and the corresponding ends of each attached to a back-wall. The back-wall of the chute preferably has an opening to which the bait container is hooked or attached. Once the bait container is attached, an opening therein is in substantial alignment with the back-wall opening allowing access to the bait therein with the chute allowing only one approach to the bait. The chute in cooperation with the upwardly pivoting portion of the trap door have the combined effect of blocking the animal's escape or retreat once the trigger means has been actuated. Furthermore, the chute preferably does not comprise a top portion covering a substantial portion of same. However, to further limit approach or access to the bait by an animal outside the chute, a bait cover is preferably incorporated along a portion of the top of the chute such that the base of the U-shaped chute is covered. This open air configuration provides the animal a less threatening environment and enhances the probability of capture.

Various latching-tripping mechanisms may be used in place of the preferred magnetic trigger-latching means without departing from the scope of the subject invention. Additionally, numerous other modifications, such as positioning the magnetic trigger means at the opposite end of the trap door, or positioning the pivot point at one end of the trap door, may also be made without departing from the scope of the subject invention.

From the foregoing description and the drawings, it should be apparent that the instant invention may be readily scaled up or down to accommodate animals of any size, literally from mice to moose, or even larger. The trap mechanism itself is easily portable and may be attached to a folding pen, to a large pen constructed in situ, or to a pen buried in the ground. Alternatively, the trap mechanism may be suspended above a pit, with the walls of the pit forming the enclosure.

In all embodiments, it may be seen that a novel and humane trap, elegant but simple of operation, and virtually escape-proof, has been created.

Accordingly, a feature of the present invention is to provide a self-resetting animal trap utilizing a closed-door approach.

Another feature of the present invention is to provide an animal trap with a less threatening environment for the animal sought to be trapped.

Yet another feature of the present invention is to provide an animal trap wherein the animal sought to be trapped is not required to enter the interior of the trap prior to triggering same and effecting capture.

Still another feature of the present invention is to provide an animal trap with self-resetting capability, thereby permitting the capture of a plurality of animals by a single trap.

Another feature of the present invention is to provide an animal trap which avoids complex triggering mechanisms.

Yet another feature of the present invention is to provide a trigger mechanism which may be selectively calibrated to different animal weight minimums.

Another feature of the present invention is to provide a trap which is readily portable and inexpensive to construct.

Still another feature is to provide a trap mechanism which is readily portable and which may be used with a collapsible pen, with a pen constructed in situ, or with an earthen pit.

A specific feature of the present invention is to provide a self-resetting animal trap comprising an enclosure having a top opening, a pivotally mounted trap door for this top opening, and means for urging the trap door toward a set-closed position from a tripped-open position.

Accordingly, these and other features and advantages of the present invention will become apparent from the following detailed description, wherein reference is made to the figures in the accompanying drawings.

IN THE DRAWINGS

DETAILED DESCRIPTION OF THE PREFERRED EMBODIMENTS

Figure 1:
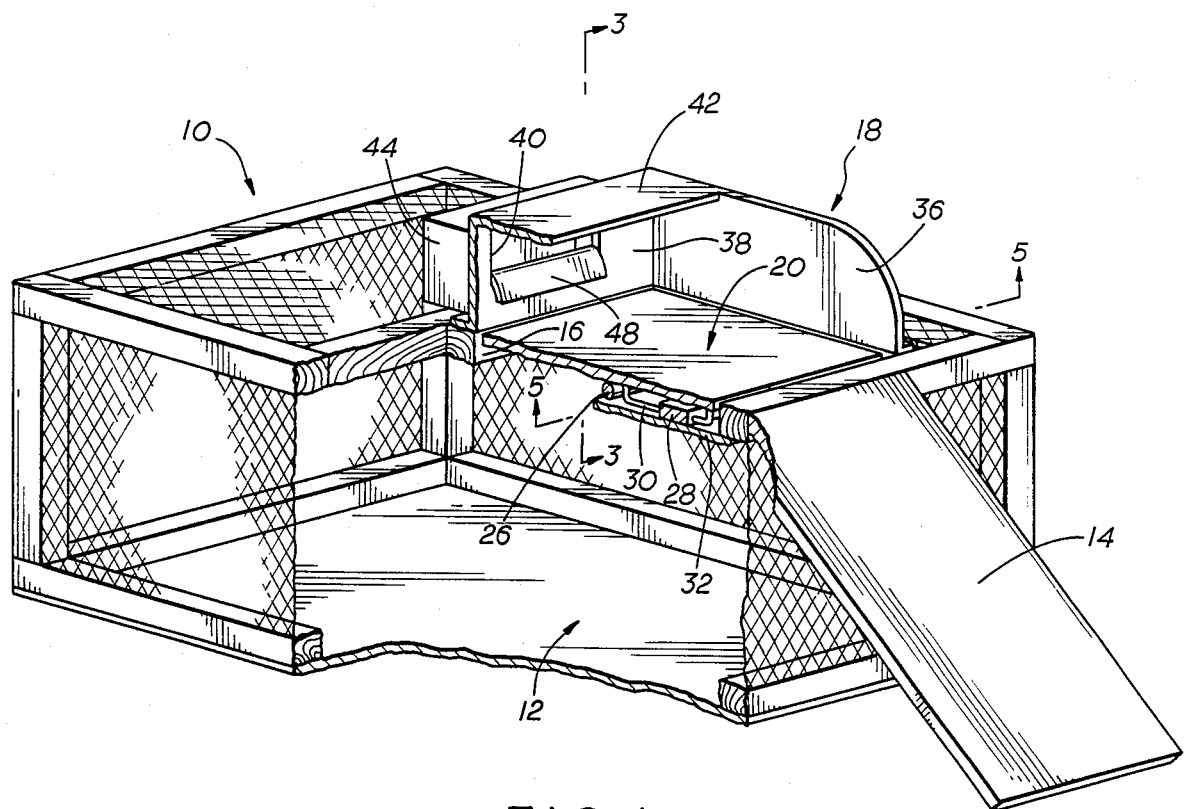
FIG. 1 is a perspective pictorial representation of an embodiment of an animal trap in partial cross-section embodying the concepts of the present invention.

In referring herein below to the various figures of the drawings, like reference numerals will be utilized to refer to identical parts and features of the devices shown therein.

Referring now to FIG. 1, there is shown by way of illustration, but not of limitation, a preferred embodiment of self-resetting animal trap denoted generally as 10. The animal trap 10 comprises an enclosure 12 having a top opening and a trap door assembly 18 on the top opening. In this embodiment, a cage 12 is utilized as the enclosure. The top opening is formed by a trap door frame 16. A ramp 14 leads from the ground to the trap door assembly 18 mounted atop the cage 12 over the top opening of same.

Figure 2:
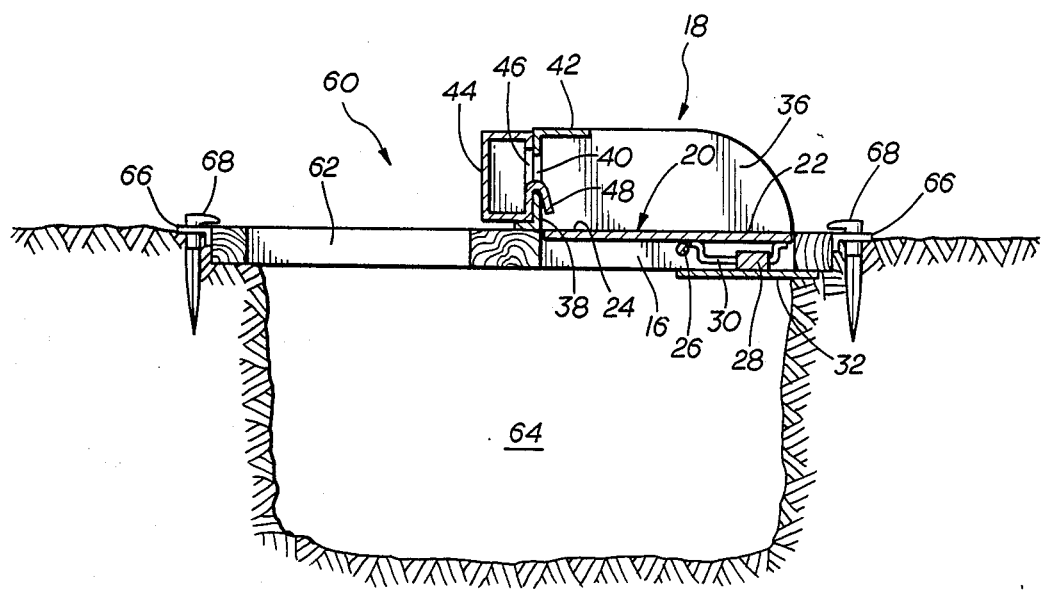
FIG. 2 is a cross-sectional view of a second embodiment of an animal trap embodying the concepts of the present invention.

Referring now to FIG. 2, there is shown another preferred embodiment of a self-resetting animal trap denoted generally as 60. The animal trap 60 also comprises an enclosure 64 having a top opening and a trap door assembly 18 on the top opening. Rather than using the cage 12 depicted in FIG. 1, a ground or earthen pit 64 is utilized as the enclosure. The trap door assembly 18 is mounted to a trap cover 62 which covers the opening of the ground pit 64. The trap cover 62 is outfitted with anchoring eyes 66 about the periphery of same. The trap cover 62 is thereafter secured to the ground by using anchoring stakes 68 through the anchoring eyes 66.

Figure 5:
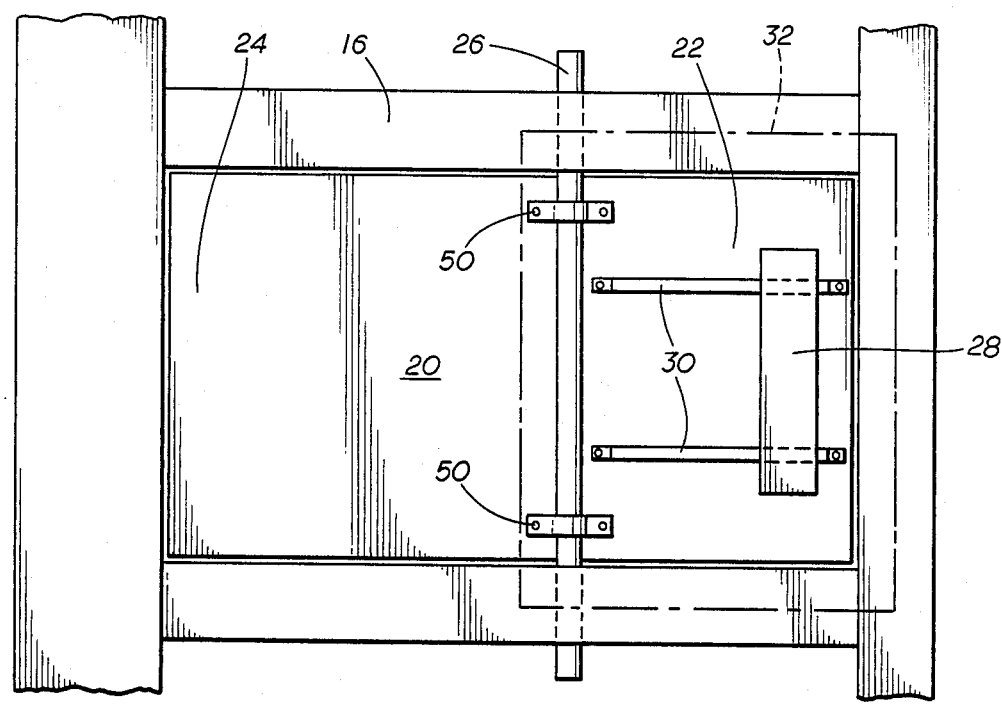
FIG. 5 is a bottom elevation of the trap door assembly shown in FIG. 3 part of which is in ghost relief.
Figure 6:
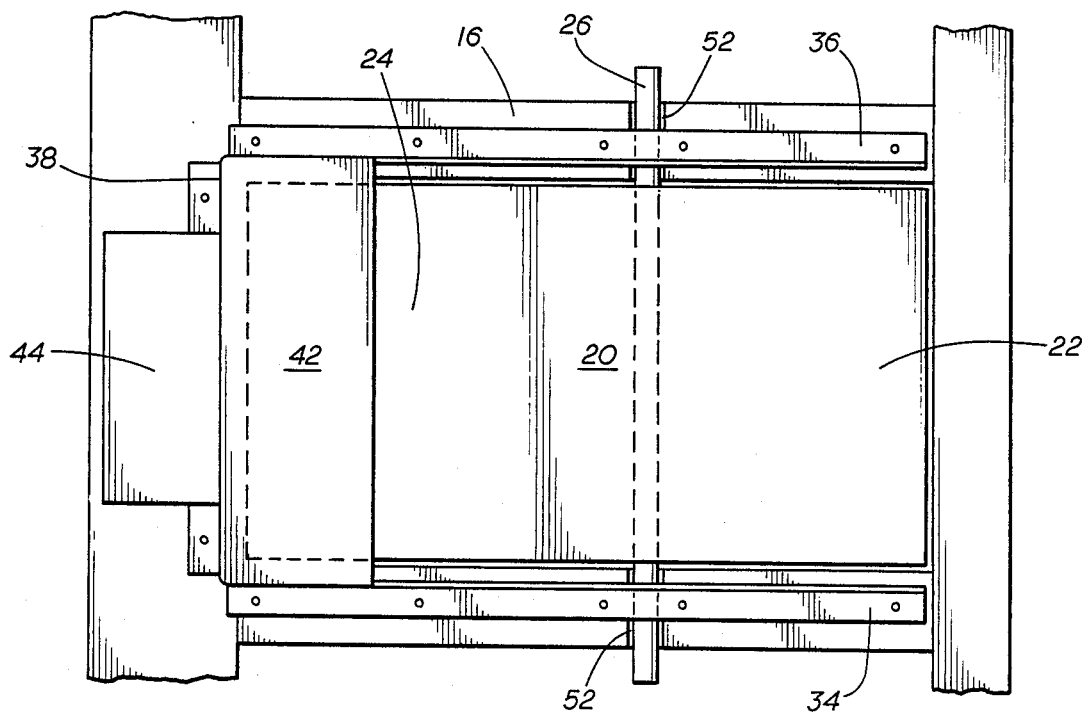
FIG. 6 is a top elevation of the trap door assembly shown in FIG. 3.

Referring now to FIGS. 3 through 6, there is shown a preferred embodiment of the trap assembly already denoted generally as 18 in both FIGS. 1 and 2. The trap assembly 18 comprises a trap door 20 pivotally mounted on a trap door frame 16, a trigger means, a bait container 44, and a chute. A pivot rod 26 is preferably attached to the underside of the trap door 20 utilizing a pair of brackets 50 as depicted in FIG. 5. The exposed ends of the pivot rod 26 are preferably positioned into a pair of slots 52 in the trap door frame 16, thereby pivotally mounting the trap door 20 as depicted in FIG. 6.

Preferably, the trap door 20 is mounted such that the trap door 20 has an upwardly pivoting portion 22 and a downwardly pivoting portion 24. Such is preferably accomplished by mounting the pivot rod 26 to an intermediate position between and parallel to the ends of the trap door 20, thereby dividing same into two portions. A planar member such as a metal plate 32 is secured to the portion of the underside of the trap door frame 16 which corresponds to one of the two portions of the trap door 20. This portion is now identified as the upwardly pivoting portion 22 due to the placement of the metal plate 32. Thus, the other portion of the trap door becomes the downwardly pivoting portion 24. A weight is preferably attached to the underside of the upwardly pivoting portion 22 to provide means for urging the trap door 20 to a closed position from an open position. Furthermore, it is preferable to incorporate means for limiting the pivoting movement of the trap door 20 such that the trap door 20 returns to the closed position after being actuated, i.e., opened. Such is preferably accomplished by having the metal plate 32 be of sufficient length and mounted so as to extend just past the pivot rod 26 beneath the downwardly pivoting portion 24 as depicted in FIG. 5 with the metal plate 32 in shown ghost relief.

The trigger means or mechanism maintains the trap door 20 in a set-closed position until the trigger means is actuated by an animal positioned on the trap door 20. In this preferred configuration, the trigger means comprises a magnet 28 mounted to the underside of the upwardly pivoting portion 22 in cooperation with the metal plate 32. The magnet 28 is preferably in contact with the metal plate 32 when the trap door is in the set-closed position. Thus, as an animal walks onto the upwardly pivoting portion 22, the animal perceives no appreciable movement of the trap door 20. Once the animal positions itself near the end of the downwardly pivoting portion 24, the magnetic trigger means herein is actuated, whereupon the trap door 20 is urged to a tripped-open position by the weight of the animal. Thereafter, the animal is deposited within the enclosure 12 or 64 and the trap door 20 is urged to its set-closed position by the weight and magnetic attractive force of the magnet 28. Thus, the animal trap 10 or 60 is self-reset.

Figure 3:
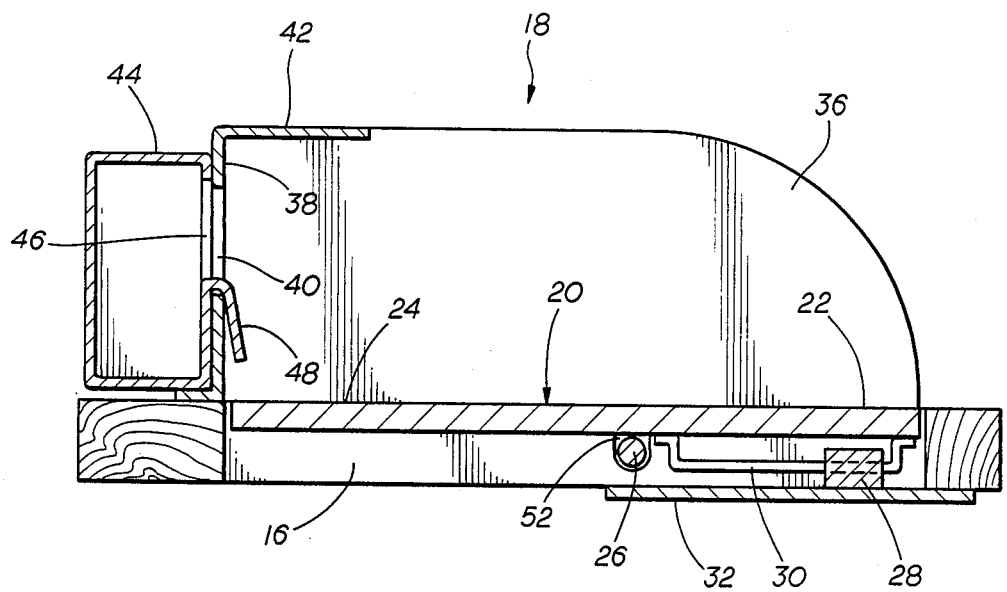
FIG. 3 is a cross-sectional view taken essentially on line 3—3 on FIG. 1 of the trap door assembly in a set-closed position.
Figure 4:
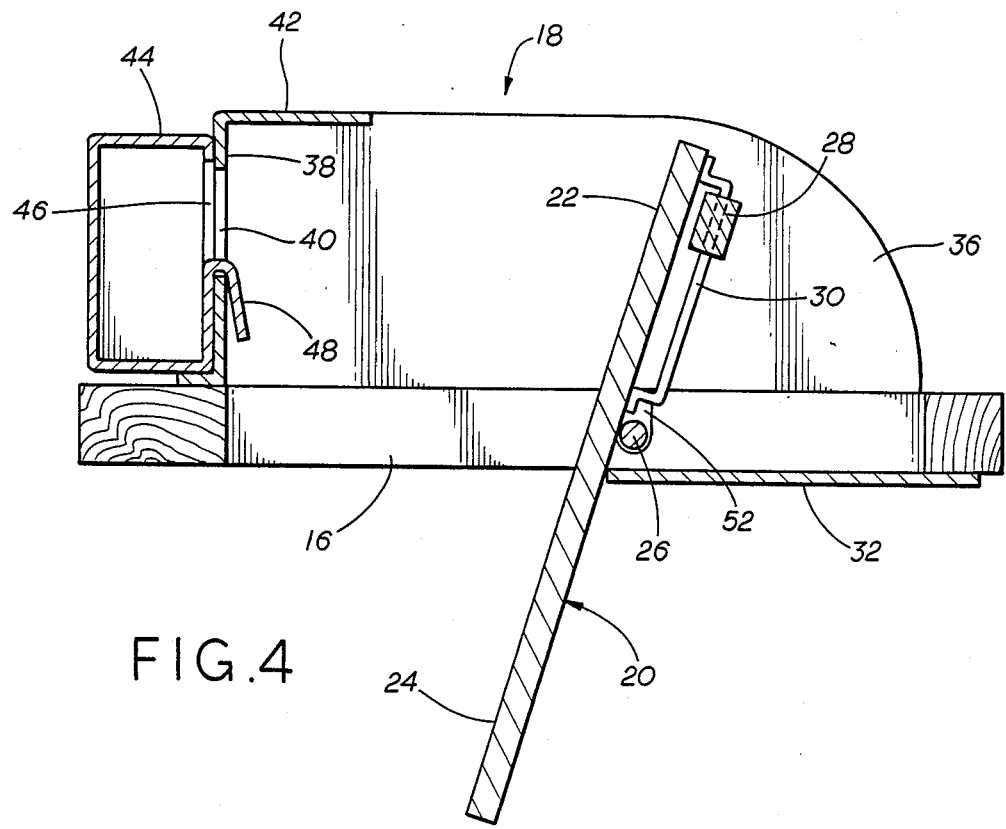
FIG. 4 is the trap door shown in FIG. 3 in a tripped-open position.

The mechanics of actuating the magnetic trigger means merits closer examination. FIG. 3 reveals that the pivot rod 26 acts a fulcrum and that the magnetic attractive force of the magnet 28 acts on a first lever whose length is the perpendicular distance from the main axis of the pivot rod 26 to the magnet 28. Likewise, when an animal walks onto the downwardly pivoting portion 24, the weight of the animal acts on a second lever whose length is the perpendicular distance from the main axis of the pivot rod 26 to a point on the downwardly pivoting portion 24 beneath the animal's center of gravity. Once the force exerted by the animal's weight exceeds that of the magnet 28 via their respective levers, the magnetic bond between the contacting magnet 28 and metal plate 32 is instantaneously broken and the magnetic trigger means is actuated. Thus, the magnetic trigger means may be preferably selectively calibrated to different animal weight minimums by varying the length of the first lever, thereby selectively varying the force exerted by same. This is preferably accomplished by slideably mounting the magnet 28 such that the magnet 28 may slide in a direction perpendicular to the long axis of the pivot rod 26. Referring now to FIG. 5, the magnet may be preferably so mounted by using a pair of magnet guides 30 which have been inserted through holes drilled through the magnet 28 (or a holder thereof). Thereafter, the ends of the magnet guides 30 are attached to the underside of the upwardly pivoting portion 22.

Referring now to FIG. 6, there is shown a top elevation of the trapping assembly 18 previously depicted in both FIGS. 1 and 2. This figure clearly depicts the bait container 44 and the chute. The bait container 44 preferably is placed adjacent to the end of the downwardly pivoting portion 24 so as to lure an animal near to the end of the downwardly pivoting portion 24. The chute provides means for restricting an animal's approach to the bait container 44 by way of the trap door 20. Preferably, the chute is U-shaped and comprises a first side wall 34, a second side wall 36, and a back wall 38 each of which is mounted to the trap door frame 16. The first side wall 34 and the second side wall 36 each is mounted to the trap door frame 16 so as to retain the exposed ends of the pivot rod 26 within their respective slots 52. As more clearly depicted in FIGS. 3 and 4, the back wall 38 has an opening 40 therein. There is a corresponding opening 46 in the bait container 44. A hook 48 is provided below the bait container opening 46 for attaching the bait container 44 to the back wall 38 by inserting the hook 48 into the back wall opening 40. Once the two are attached, the back wall opening 40 and the bait container opening 46 are in substantial alignment allowing access to the bait within the bait container 44 to an animal within the chute. To further limit an approach to the bait by an animal outside the chute, a bait cover 42 is preferably incorporated along a portion of the top of the chute such that the base of the U-shaped chute is covered. With the chute in place, the chute walls 34, 36, and 38 cooperate with the upwardly pivoting portion 22 so as to effectively block an animal's retreat or escape once the magnetic trigger means is actuated as is readily apparent in FIG. 4.

It will be apparent from the foregoing that many other variations and modifications may be made in the apparatus and methods herein before described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A self-resetting animal trap having a top-opening enclosure adapted to receive a trap door assembly, said trap door assembly comprising frame means adapted to snugly engage the top opening of said enclosure, trap door means pivotally mounted on said frame means, said pivotal mounting being situated intermediate a pair of the edges of said trap door means so as to divide said trap door means into a supporting portion and a trapping portion, ferrous member means secured to said frame means and positioned immediately below said supporting portion of said trap door means, magnetic trigger means moveably secured to the underside of said supporting portion so as to engage said ferrous member means when said trap assembly is at rest and to be selectively trippable, bait housing means secured to said trap assembly adjacent the trapping portion of said trap door means, and chute means adjacent said bait housing means for restricting approach to said bait housing means, whereby the escape of an animal activating said trap door means is impeded by the supporting portion of said trap door means upon activation thereof.

2. The self-resetting animal trap as described in claim 1, further comprising means for limiting the motion of said trap door means upon activation.

3. The self-resetting animal trap as described in claim 2, wherein said motion limiting means comprises an extension of said ferrous member to a position adjacent a portion of said trapping portion of said trap door means.

4. The self-resetting animal trap as described in claim 2, wherein said motion limiting means further comprises means for restricting escape by a trapped animal through a portion of said opening during activation of said trap door assembly by a second animal.

5. The self-resetting animal trap as described in claim 1, wherein said bait housing means comprises a vertical wall member supporting a recessed housing for bait and having an opening therein for access to said bait, said opening having a lower edge covered by a smoothly and downwardly sloping hook member, thereby preventing the use of said lower edge as an aid to the escape of an animal activating said trap assembly.

6. The self-resetting animal trap as described in claim 5, wherein said recessed housing is removeable from said wall member and is supportable in close proximity thereto by said smoothly and downwardly sloping hook member.

* * * * *